United States Patent [19]

Foxford

[11] Patent Number: 4,922,887
[45] Date of Patent: May 8, 1990

[54] PORTABLE CAMP COOKER

[76] Inventor: Kenneth E. Foxford, 2477 Kino St., Yuma, Ariz. 85364

[21] Appl. No.: 398,547

[22] Filed: Aug. 25, 1989

[51] Int. Cl.⁵ .......................... A47J 37/00; F24C 3/00
[52] U.S. Cl. ................................ 126/41 R; 126/9 R; 126/29
[58] Field of Search ................. 126/25 R, 25 A, 9 R, 126/9 B, 41 R, 147, 151, 146, 29, 30, 50; 99/450, 422, 425

[56] References Cited

U.S. PATENT DOCUMENTS

| 970,501 | 9/1910 | Holbrook | 126/29 |
| 2,790,434 | 4/1957 | Del Francia | 126/41 R |
| 4,126,116 | 11/1978 | McCallum | 126/9 R |
| 4,582,041 | 4/1986 | Erickson | 126/9 R |
| 4,829,977 | 5/1989 | Valentine | 126/9 R |

*Primary Examiner*—James C. Yeung
*Attorney, Agent, or Firm*—Gregory J. Nelson

[57] ABSTRACT

A portable camp cooker having a housing which is collapsible for storage. In use, the device is surrounded by a collapsible barrier so insulation such as earth fill may be placed around the housing. Air is delivered to a burner in the housing through a pipe which also contains a fuel line and the air fuel ratio is adjustable. The cover for the housing may enclose the cooking chamber or may have an opening which will accept a cooking utensil.

12 Claims, 3 Drawing Sheets

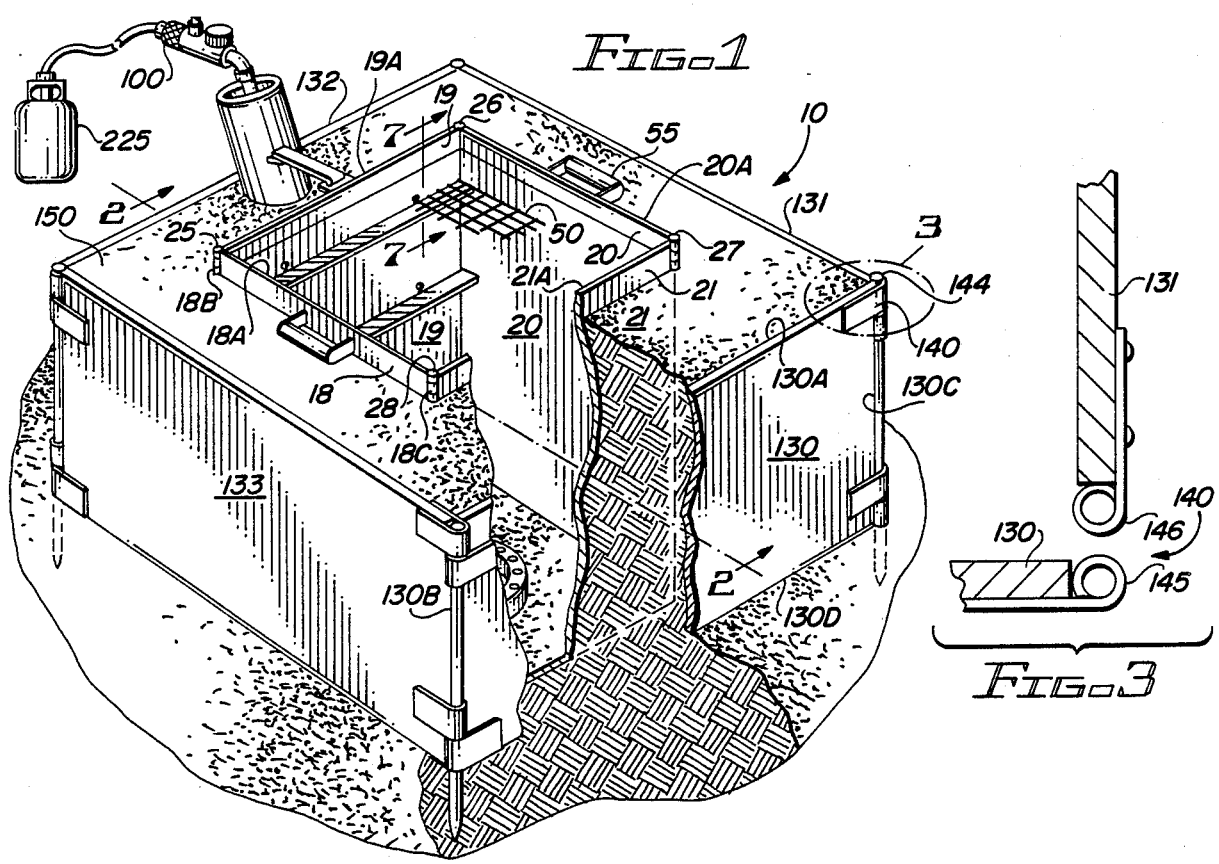
FIG-1
FIG-3
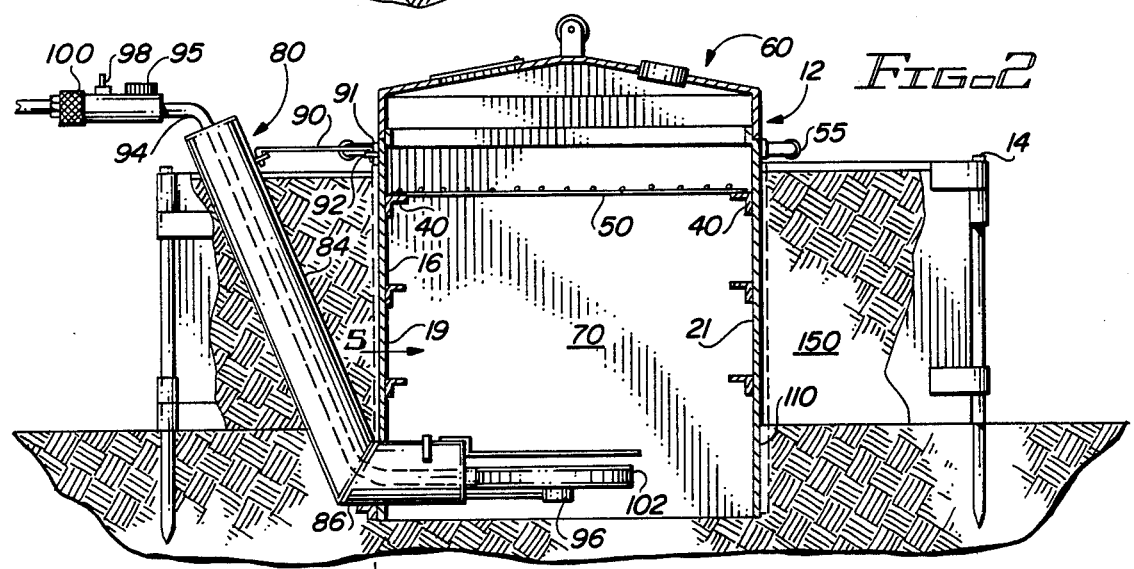
FIG-2
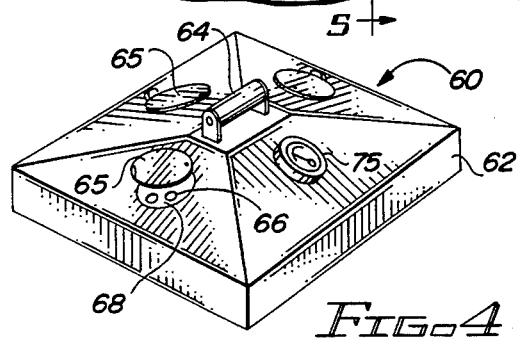
FIG-4
FIG-5

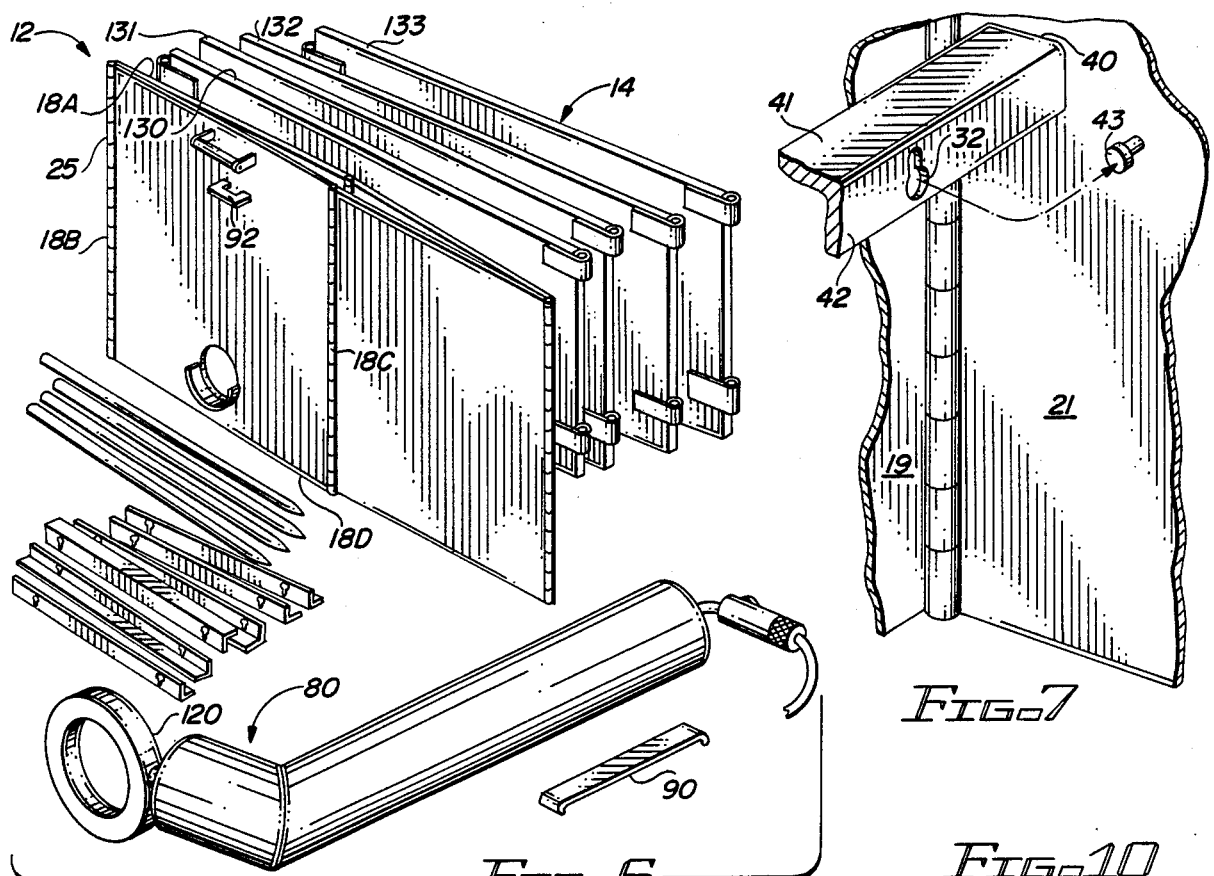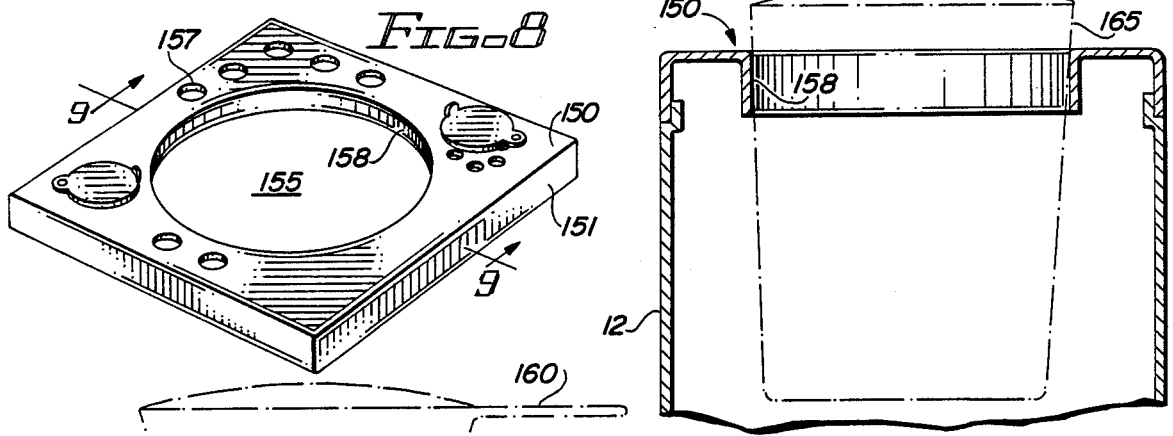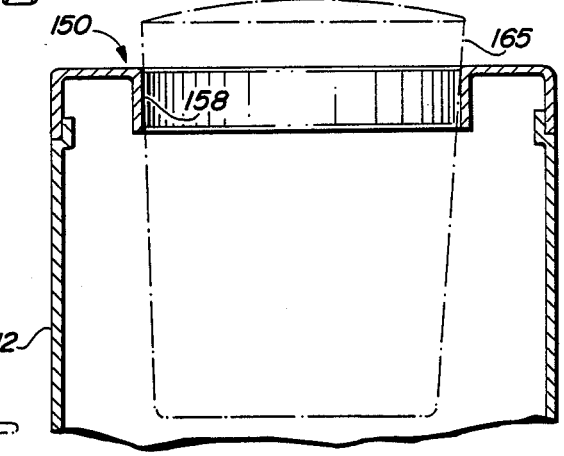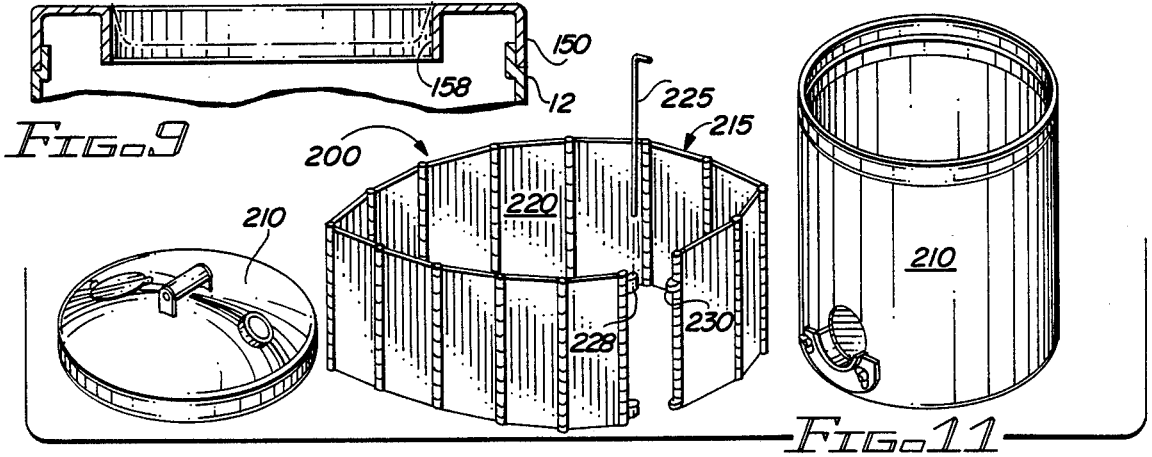

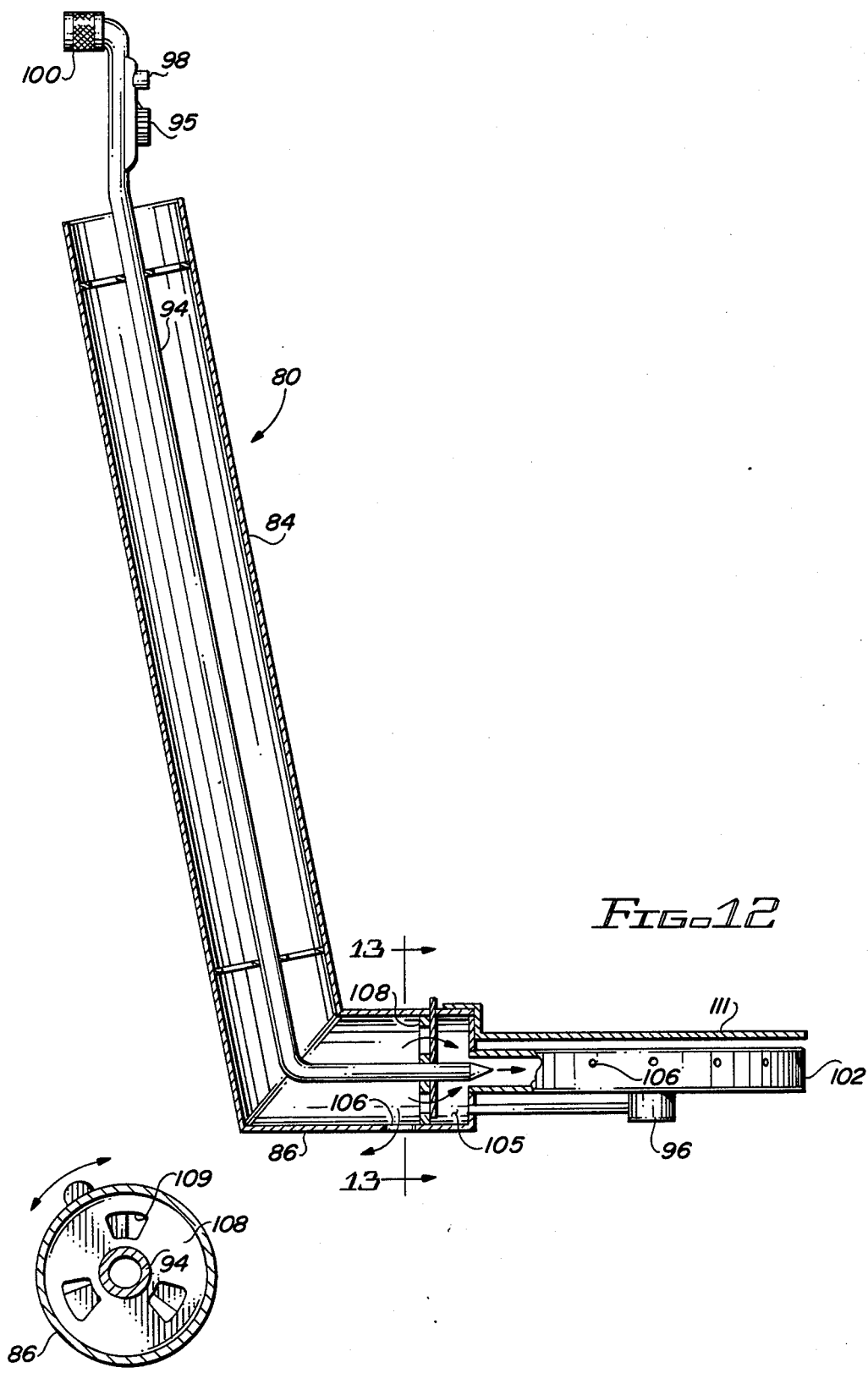

PORTABLE CAMP COOKER

BACKGROUND OF THE INVENTION

The present invention relates to a cooker and more particularly to a portable, collapsible outdoor cooker for use by hikers, campers, and the like. Safe outdoor practice dictates that cooking in public recreational areas, camping areas and the like be accomplished in a manner which contains the fire. Often this is accomplished by the camper or hiker digging a fire pit and surrounding the pit with rocks that have been collected from the area and placing an elevated grill or grate on the rocks to support the grill or grate above the fire. A fire pit of this type may be practical in many instances but may present a hazard and in the case of wind, coals or incendiary ashes may be spread to nearby combustible materials resulting in a fire. Further, such open pit fires are not suitable for all types of cooking.

In view of this, there exists a need for a safe and convenient portable camp cooker for use by campers, hikers and other outdoor sports enthusiasts. The prior art contains a number of camp stoves and these are not generally easily portable and are often limited in use serving only as a cooktop surface, not being suitable for baking or other cooking methods.

Accordingly, there exists a need for a portable, durable, relatively inexpensive outdoor cooking device which may be used for various types of cooking such as grilling, frying, baking and the like and which device can be safely used as a insulated, controlled campfire facility.

Accordingly, it is an object of the present invention to provide a safe, portable outdoor cooking grill.

Another object of the present invention is to provide a camp cooker which includes a collapsible barrier which may be erected around the cooker and filled with a suitable insulating material such as earth.

Another object of the present invention is to provide an insulated camp cooker which may be partially surrounded by earth and used as a cooking grill, stove top, oven or deep fryer.

Still another object of the present invention is to provide a portable, collapsible camp grill which may be easily erected and put in use as a controlled cooking fire.

Another object of the present invention is to provide a camp grill having a housing or firebox defined by hinged panels which are collapsible to a compact position when not in use and further including a collapsible barrier which may be erected around the firebox and filled with a suitable insulating material such as earth.

BRIEF DESCRIPTION OF THE INVENTION

Briefly, the present invention consists of a portable camp cooker having a housing or firebox defined by a plurality of wall panels which are hingedly connected so they may be collapsed in a storage position and when erected form a housing or firebox. The housing is open at the top and the bottom and has a plurality of internal projections which support a horizontal rack or grill cooking surface at various elevations within the housing. A removable cover is provided at the top or upper end and includes one or more adjustable air vents. In one embodiment of the invention, the cover is provided with a central opening having a peripheral lip or flange which cooperates with a cooking utensil such as a fry pan or deep fryer. A fuel and air delivery system includes an air pipe which may be detachably secured near the bottom end of the housing and held in place by a bracket extending between the air pipe and the housing. The fuel supply is provided by a fuel line extending within the air line and terminating at a burner in the bottom of the housing. A suitable control valve and igniter mechanism for the gaseous fuel are also provided.

In use, the device is placed on the ground or partially inserted into a depression in the earth. A portable, collapsible barrier is erected around the housing of the cooking unit with a space of from 6" to 12" defined between the exterior walls of the cooker and the interior walls of the barrier. This space is preferably filled with a convenient insulating material such as earth. In use, the walls of the cooking unit are insulated by the earth to prevent spread of fire and to prevent accidental injury to campers. The insulated cooking unit provides high, uniform internal temperature so the unit may be used as an oven or for stove top cooking. With the cover removed, the cooker may be used as a conventional grill with food to be cooked supported on a rack or grill above the burner.

BRIEF DESCRIPTION OF THE DRAWINGS

The above and other objects and advantages of the present invention will become more apparent from the following detailed description and drawings in which:

FIG. 1 is a perspective view partly broken away, of the cooker and barrier in an erected position;

FIG. 2 is a sectional view taken along line 2—2 of FIG. 2;

FIG. 3 is a detail view of the housing hinge as indicated in FIG. 1;

FIG. 4 is a perspective view of the cover;

FIG. 5 is a sectional view taken along lines 5—5 of FIG. 2;

FIG. 6 is a perspective view of the cooker components in a collapsed condition;

FIG. 7 is a perspective view partly in section of the rack or grill support as indicated by line 7—7 in FIG. 1;

FIG. 8 is a perspective view of an alternate cover configuration;

FIG. 9 is a sectional view taken along lines 9—9 of FIG. 8;

FIG. 10 is a view similar to FIG. 9;

FIG. 11 is a perspective view of another embodiment of the invention;

FIG. 12 is an enlarged view partly broken away illustrating the air-fuel delivery pipe as indicated in FIG. 1; and FIG. 13 is a sectional view taken along lines 13—13 of FIG. 12.

DESCRIPTION OF THE PREFERRED EMBODIMENTS

Turning now to the drawings, a preferred embodiment of the present invention is shown in FIGS. 1 to 7, 12 and 13 and is generally designated by the numeral 10 and includes a cooker unit 12 and a barrier or retainer 14. In the embodiment of FIGS. 1 to 7, 12 and 13, the cooker 12 has a housing 16 comprised of a plurality of panels 18 to 21. The housing is shown as being generally rectilinear in cross section but may be any convenient shape. Each of the panels 18 to 21 has a generally horizontal upper edge, generally horizontal lower edge and oppositely extending sides. For example, the upper edge of panel 18 is designated 18A, the opposite sides as 18B and 18C, respectively, and the bottom edge is 18D. The other panels are similarly designated using the letters A, B, C and D appended for top, sides and bottom edges. Side 18B of panel 18 is pivotally connected to side 19C of panel 19 by vertically extending hinge 25. Panels 19 and 20 are similarly joined at vertically extending hinge 26 as are panels 20 and 21 at vertically extending hinge 27. Vertical hinge 28 interconnects panels 21 and 18 at sides 18C and 21B. The housing may be easily collapsed and stored in a flattened position as seen in FIG. 6. Handles 55 are provided on the exterior of panels 18 and 20 for convenience for lifting and erecting the housing.

A plurality of flanges in the form of angle members 40 are detachably mounted on the interior side of housing panels 19 and 21 at vertically spaced apart locations with a horizontal leg 41 and a vertical leg 42. Projections 43 are engageable in keyhole-shaped holes 32 to attach the flanges to the opposite interior walls of the housing. In the erected position, the projections 43 support the flanges which, in turn, support cooking grill 50 which may be positioned at various elevations within the housing. The grill or grate 50 is of conventional construction having a frame comprised of a plurality of bars of suitable heat-resistant material such as chrome steel.

A cover 60 of sheet metal or other heat resistant material may be placed over the upper end of the casing as best seen in FIGS. 2 and 4. The cover is generally rectangular and has a lip 62 which engages the upper end of the casing and is provided with a handle 64 for use. One or more vents 65 are provided in the surface of the cover. The vents include an opening 66 in the cover and a valving member 68 which is shown in the form of a rotatable metal disk. The disk may be rotated positioning the disk relative to the opening 66 in the cover to control the flow of air and combustion materials from the interior of the cooker. A temperature guage 75 may be provided on a cover 60 to give the user an indication of the internal temperature in the cooking chamber 70.

Air is supplied to the cooker by means of air pipe 80 as best seen in FIGS. 2, 12 and 13. The air pipe 80 has a generally elongate tubular body section 84 and terminates at a lower section 86 which forms an angle with respect to the main body section. The lower end of the air pipe is received in an opening or aperture 87 defined in the lower edge of panel 19 and is secured therein by a plate 88 which engages the panel. Plate 88 is attached to the housing by wing nuts 89. To further secure the air pipe in place, a brace member 90 extends generally horizontally from the main tube, also having a hook 91 which is detachably engageable at latch 92 at the upper edge 19A of panel 19. Thus, when the unit is assembled, the air pipe 80 is positioned with the lower end of the air pipe engaged in the opening 87 at the lower end of the panel and brace 90 engaged at the upper edge of panel 19.

As best seen in FIG. 12, extending axially within the air pipe is a fuel line 94. Typically, fuel will be butane or propane contained in a suitable storage tank. A control valve 95 is provided at the upper end of the fuel line and projects from the upper end of the air pipe. A conventional igniter or striker 96 is positioned at the lower end of pipe 84 adjacent burner 102 and is actuated at buttom 98 at the upper end of the pipe. The upper end of the fuel line has a quick-connect coupler 100 which is adapted to be connected to the hose connected to the source of butane or propane.

The lower end of the fuel line supplies burner 102 which is shown as an annular member having a plurality of orifices 106 therein. Air is supplied to the burner in the annular area around the fuel line within air supply tube 84. When the fuel is ignited, a flame will be emitted from the orifices 106 in the gas burner. The fuel flow is controlled by means of the control valve 95 at the upper end of the fuel supply line. The fuel line terminates at gas jet in chamber 105. Air is admitted through openings 109 which are adjustable by means of air valve plate 108 which is set by the user. Excess air is vented from the air tube at vent 106 in the lower portion of section 86 of the air pipe as best seen in FIGS. 12 and 13. A plate 111 extends horizontally above the burner to serve as a shield for grease and drippings.

In use, the cooker is placed on the ground or placed in a pit 110 with the housing 16 at least partially extending below ground level as seen in FIGS. 1 and 2. It is obviously a difficult procedure to dig a pit deep enough to accomodate the entire cooker. Accordingly, a barrier or retainer 14 is provided. The barrier or retainer consists of a plurality of panels 130 to 133, each being generally rectangular. For example, panel 130 has an upper edge 130A, lower or bottom edge 130D and opposite sides 130B and 130C. The other panels are similarly configured. Panels 130 and 131 are connected along a vertically extending hinge 140 at sides 130C and 131B. Panels 131 and 132 are pivotally connected as are panels 132 and 133 by pins 144. The typical hinge connected is shown in FIG. 3 and comprises hinge leafs 145 and 146 on the respective panels which align and receive hinge pin 144. Pin 144 extends the height of the panels and may be driven into the ground for stability.

The barrier is of sufficient size so that when erected it will enclose the cooker housing leaving a spacing of approximately six to twelve inches between the exterior of the casing and the interior of the barrier. When the barrier is erected, the hinge leafs 145, 146 at the adjacent sides of the panels are aligned and pin 144 inserted and driven into the ground.

With the cooker in place, either positioned on the ground or partially placed in a pit 110 as shown in FIG. 2, and the barrier erected around the cooker casing, the user may place appropriate insulative fill such as earth 150 in the area between the casing and the barrier wall. The earth will serve to insulate the casing and retain heat within the casing. The barrier and earth also provide a significant safety factor as the exterior of the housing is not exposed thereby minimizing the possibility of an accidental burn to a user. Also, the possibility of fire hazard is substantially minimized since the fire is fully contained within the insulated casing.

In use, the fuel line 94 is connected to a suitable source of fuel such as a butane tank 225 at connector 100. Fuel is ignited using a match or igniter 98 and the fuel flow adjusted to the proper level. Air to support combustion is introduced into the chamber 105 at lower end of the casing through the annular air flow area within the air pipe 80. The air/fuel ratio is first pre-set at valve plate 108 In the event the user wishes to cook foods, grate 50 may be placed on the supporting flanges 40 at a suitable level within the housing. If the user wishes to bake items, the items to be baked contained within a dish can be placed on the grill and the cover placed on the upper end of the casing. The vents 65 may be adjusted to control the temperature within the interior cooking chamber, which temperature can be monitored on the temperature guage 75.

When the camper wishes to break camp and the grill is cool, the barrier 14 is easily removed by removing pin members 144 and lifting the barrier. The barrier consisting of hingedly secured generally planar panels may be folded into a compact unit for transportation and storage. The air flow pipe and contained fuel line 80 may be detached from the housing and the earth moved away from the housing. The housing may be then folded in a compact position by removing the flanges 40. Fill dirt can be evenly spread about the camp site and used to fill any pit that was dug to accomodate the lower end of the casing. The individual components, as seen in FIG. 6, are compact and may be easily stored in a box or bag for convenience.

FIGS. 8 to 10 show an alternate embodiment of the present invention. In this embodiment, the grill housing, air and fuel supply system 80 and barrier 14 are the same as have been described above and further detailed description is not believed necessary.

Cover 150 is again designed to enclose the upper end of the casing having a lip 151 extending peripherally around the upper end of the casing. The cover defines a central opening 155 having a peripheral lip or flange 158. A plurality of air vents 157 are provided in the cover. The center opening 155 accomodates a cooking utensil such as a fry pan 160, as seen in FIG. 9, or deep fryer 165, as seen in FIG. 10. The utensil is complimentarily configured having a peripheral lip or tapered exterior engageable with the lip of the cover so that the utensil may be supported by the cover. The utensil has a suitable cover and handle and may be placed in a supported position in the cover and foods therein cooked or kept warm due to the heat generated within the cooking chamber. Foods or foods and cooking utensils may also be supported on the rack or grates supported within the cooking chamber while at the same time the utensil is supported from the cover or lid.

FIG. 11 shows another embodiment 200 in which the cooker 210 is generally cylindrial having round cover 210. The barrier 215 has a plurality of hinged sections 220 which may be folded in a flat, stored position. When assembled, the barrier is placed around the cooker and the end sections joined by extending the ground stake 225 through the aligned loops 228 and 230. In other respects, the camp cooker of embodiment 200 is as has been described above.

The present invention provides a new, novel and useful cooking stove. Various changes, alterations and modifications may be made to the invention described herein without departing from the spirit and scope of the appended claims. For example, various materials may be used in the construction of the cooker and barrier. Also, the cooker and barrier may be made in various sizes and shapes and may include or delete some of the various accessory features described above. To the extent that these various changes, alterations and modifications do not depart from the spirit and scope of the appended claims, they are intended to be encompassed therein.

I claim:

1. A camp cooker comprising:
    (a) a housing having a wall with upper and lower ends and defining a cooking chamber therein having upper and lower ends;
    (b) a burner located in the lower end of said cooking chamber;
    (c) an air delivery tube extending from the lower end of said cooking chamber to a location at least approximately corresponding to the upper end of said housing;
    (d) a fuel supply line extending along said air delivery tube for supplying fuel to said burner in said cooking chamber; and
    (e) barrier means including wall means extending substantially around said housing and defining a space between said barrier and housing which space is adapted to receive an insulating material to insulate said housing.

2. The camp cooker of claim 1 wherein said housing wall comprises a plurality of hinged panels which are collapsible to a stored position and further including fastener means for securing said panels in an erected position forming said housing.

3. The camp cooker of claim 1 wherein said barrier means comprises a plurality of hinged panels which are collapsible to a stored position and further including fastener means for securing said panels in an erected position forming said barrier means.

4. The camp cooker of claim 1 wherein said removable cover defines an opening therein adapted to support a cooking utensil.

5. The camp cooker of claim 1 wherein said fuel supply line extends generally axially within said air delivery tube and said air delivery tube and fuel supply line commonly discharge into a mixing chamber adjacent the burner.

6. The camp cooker of claim 5 wherein said fuel supply line includes fuel control valve means for regulating the flow of fuel therethrough.

7. The camp cooker of claim 6 further including igniter means for igniting fuel supplied through said fuel supply line to said burner.

8. The camp cooker of claim 7 further including support means extending between said air delivery tube and said housing.

9. The camp stove of claim 8 wherein said removable cover includes adjustable vent means.

10. The camp cooker of claims 2 or 3 wherein said fastener means comprise at least one ground stake.

11. The camp cooker of claim 1 further including rack support means associated with said housing for supporting food in said cooking chamber.

12. The camp cooker of claim 1 further including a removable cover engageable with the upper end of said housing.

* * * * *